United States Patent [19]

Rosenberg

[11] 3,896,014
[45] July 22, 1975

[54] UV CURABLE POLYENE-POLYTHIOL-SURFACTANT COMPOSITIONS

[75] Inventor: Ira Rosenberg, West Norwalk, Conn.

[73] Assignee: Clairol Incorporated, New York, N.Y.

[22] Filed: June 14, 1973

[21] Appl. No.: 370,071

[52] U.S. Cl.. 204/159.23; 204/159.14; 204/159.18; 204/159.24; 260/17.4 R; 260/37 N; 260/37 AL; 260/42.2 L; 260/77.5 BB; 260/77.5 CR; 260/77.5 MA; 260/77.5 AM; 260/79.5 B; 260/79.5 R; 260/79.5 NV; 260/858; 260/874; 427/4; 427/53; 427/54
[51] Int. Cl.$^2$... C08F 2/50; C08F 4/28; C08L 75/00
[58] Field of Search...... 204/159.18, 159.14, 159.23

[56] References Cited
UNITED STATES PATENTS
3,661,744   5/1972   Kehr et al................. 204/159.14 X

*Primary Examiner*—John C. Bleutge
*Assistant Examiner*—Thurman Kennis Page
*Attorney, Agent, or Firm*—Irving Holtzman; David J. Mugford; George A. Mentis

[57] ABSTRACT

Photocurable liquid nail lacquer compositions comprising a polyene, a polythiol, a photocuring rate accelerator and a surfactant from a particular class; these compositions being curable to a hard nail finish when applied to nails and exposed to actinic light.

39 Claims, No Drawings

UV CURABLE POLYENE-POLYTHIOL-SURFACTANT COMPOSITIONS

This invention relates to liquid nail lacquer compositions and particularly to photocurable compositions of this character. More specifically, it concerns nail lacquer compositions containing liquid polymer materials which compositions are adapted to be applied to human nails and cured rapidly to form a hard nail coating on being exposed to actinic light and especially ultraviolet light.

A large variety of nail lacquer compositions are known in the prior art and are sold commercially. These generally consist of complicated systems containing anywhere from 6 to 8 different components. Typically, they contain a primary film former, e.g., nitrocellulose; solvents such as butyl acetate, ethyl acetate, toluene and ethyl alcohol (all of which are flammable); pigments which can stain the nail; resins both natural and synthetic that are added to aid the film forming properties of the primary film former and certain materials which aid the wetability of the film to the nail. All of the above ingredients must be critically balanced to obtain a good nail lacquer. However, even after this is accomplished, the best nail lacquers still suffer from many drawbacks.

Although, in general, the adhesion of commercial nail lacquers is good on the nail surface, the lacquers are still prone to chipping and scratching after several days of wear. Furthermore, since commercial lacquers dry through solvent evaporation and from the outside in, the gloss properties of the resulting surface are poor. In addition, several coats are usually needed to obtain good color coverage and acceptable gloss properties. However, the application of subsequent coats of nail lacquer over the initial coat will cause the initial coat to flow. This means that the consumer must be careful in applying the second coat. Also, with multiple coats the drying time becomes extremely long.

In addition, with these prior art products, the consumer must work fast and carefully because of solvent evaporation. A failure to do this may result in premature hardening and the loss of good smooth coverage. Furthermore, due to solvent evaporation, the consumer usually discards a bottle of nail polish which dries up in the bottle before she has used its contents.

Commercial nail lacquers are generally removed by means of solvents. Since these are usually fat solvents, they can defat and dry both the nails and skin. Commercial nail lacquers, moreover, have poor resistance to abrasives and consequently, are easily scratched and worn by cleaning abrasives. In addition, the retouching of commercial nail polish on individual nails is impossible since the surface of the nails which have not been retouched is dull and scratched compared with the freshly applied surface.

It has now been found that the aforesaid disadvantages encountered with commercial nail lacquers can be substantially reduced or eliminated by employing a photocurable polymer system described in more detail below as the main film former in place of the conventional film formers such as nitrocellulose. This photocurable system is less complex than the conventional nitrocellulose system. Whereas the conventional nail polish contains nine components, the present system may contain as little as four. Moreover, the conventional nail polishes are flammable, and due to the explosive nature of nitrocellulose, require special handling. The photocurable system of this invention contains no solvents and is relatively safe to compound and process.

The resistance to chipping of the present system is equal to, if not better than, conventional nail polish. Moreover, the adhesion can be varied depending upon what the individual consumer wants. For example, short adhesion can be obtained if there is no pretreatment of the nail. The polymer will usually adhere on all ten fingers for 12 to 24 hours, at which time due to normal wear it will start to release from the nail. Adequate adhesion can be obtained by pre-cleaning the nails with acetone or ethyl acetate.

Since there is no solvent evaporation in the curing process involved in this invention, a smooth flawless surface with extremely high gloss is produced. Gloss measurements have substantiated these observations. Complete coverage can be obtained with as little as two coats. In addition, complete drying per coat can be accomplished in less than a minute, compared with ten minutes or longer for two coats of conventional nail polish. Red pigments appear to shorten this curing time and no pigment bleed or staining of the nails has been found. Furthermore, unlike conventional nail lacquer subsequent coats of the present photocurable nail polish will not soften or damage previous coats that have been cured. This permits high fashion nail designs to be placed on top of the pigmented undercoat.

With the present composition, the consumer has complete freedom to work slowly and carefully and then to dry the coat in less than a minute when she is satisfied with the results she has attained. Moreover, since there is no solvent in the system, the polymer will not dry up in the bottle. However, it will cure if not protected from light. Furthermore, the polymer film laid down by this invention has excellent abrasive resistant and scratch resistant properties.

The compositions of the present invention provide a retouching capability which has a tremendous advantage. A nail to which the present composition has been reapplied three or four days after the original application cannot be distinguished from the polish applied several days before. The instant nail lacquer compositions are removed by soaking the nails in warm water. There is no need to use solvents which can defat and dry the nails as is characteristic of prior art nail lacquer compositions.

It is, accordingly, an object of the present invention to provide nail lacquer compositions which avoid the many disadvantages described above now encountered in the use of prior art nail lacquers.

It is also an object of this invention to provide photocurable nail lacquer compositions which avoid the aforesaid disadvantages.

It is a further object of this invention to provide a method for applying a photocurable nail lacquer composition to human nails.

Other and more detailed objects of this invention will be apparent from the following description and claims.

The nail lacquer compositions of the present invention comprise generally a photocurable liquid system containing as essential ingredients at least one polyene, polythiol, photocuring rate accelerator, and one or more of a class of special surfactants described in more detail below. This liquid system is adopted to form a cohesive film when applied to human nails and exposed to actinic light and particularly ultraviolet light (e.g., 3660al.

In addition to the aforesaid essential ingredients, other auxiliary components may be added to the composition which do not interfere with the curing process. Thus, for example, the composition may contain pigments, dyes, organic solvents (which serve as viscosity regulating agents), plasticizers, etc. There may also be incorporated into the present nail lacquer compositions auxiliary resins which do not interfere with the principle curing reaction. Since the present composition is subject to be cured by the action of light which may be initiated by opening and closing the container in which the material is stored, it is often advisable to add a stabilizing agent or system to the composition to prolong the shelf life of the product.

To further illustrate the various auxiliary agents that may be incorporated in the present composition, the following is given:

Organic solvents: ethyl acetate, ethanol, isopropyl alcohol, methanol, butyl acetate, glyme (i.e., $CH_3OCH_2CH_2OCH_3$), diglyme (i.e. $CH_3OCH_2CH_2OCH_2CH_2OCH_3$), methyl ethyl ketone, diethyl ketone, acetone, toluene, and proprietary cosmetic solvents.

Pigments:

| Pigment | Chemical Name | C.I. Number |
|---|---|---|
| D&C Red No. 2 | — | 16185 |
| D&C Red No. 7 | C.I. Pigment Red 57:1 | 15850:1 |
| D&C Red No. 10 | C.I. Pigment Red 49 | 15630 |
| D&C Red no. 11 | C.I. Pigment Red 49:2 | 15630:2 |
| D&C Red No. 12 | C.I. Pigment Red 49:1 | 15630:1 |
| D&C Red No. 13 | C.I. Pigment Red 49:3 | 15630:3 |
| D&C Red No. 30 | C.I. Vat Red 1 | 73360 |
| D&C Red No. 34 | C.I. Pigment Red 63:1 | 15880:1 |
| D&C Red No. 3 | C.I. Acid Red 51 | 45430 |
| D&C Yellow No. 5 | C.I. Food Yellow 4 | 19140 |
| D&C Yellow No. 6 | — | 15985 |
| D&C Orange No. 4 | C.I. Acid Orange 7 | 15510 |
| D&C Blue No. 1 | — | 42090 |
| D&C Blue No. 6 | C.I. Vat Blue 1 | 73000 |
| D&C Green No. 5 | C.I. Acid Green 25 | 61570 |
| D&C Green No. 6 | C.I. Solvent Green 3 | 61565 |
| Cosmetic Green C61-6735 | — | 77289 |
| Cosmetic Green C61-1245 | — | 77268 |
| Rose 3515 B 309 | — | 77007 |
| Brown B-3282 | — | 77491 |
| Yellow 3170 | — | 77492 |
| Black A 8214 | — | 77499 |
| Blue C-43-W1810 | — | 77077 |
| Rust 3551 | — | 77491 |
| Green 3586 | — | 77288 |

Plasticizers: dibutyl phthalate, dibutyl citrate, etc.

Resins: Santolite (copolymer of equimolecular proportion formaldehyde and p-toluene sulfonamide), vinyl pyrrolidone/vinyl acetate (50/50 and 35/65 mole percent respectively); Gantrez AN 119 (methyl vinyl ether/maleic anhydride copolymer 1:1 molar relationship, low molecular weight grade Av. M.W. 250,000); Gantrez AN 139 (methyl vinyl ether/maleic anhydride copolymer 1:1 molar relationship, medium molecular weight grade Av. M.W. 500,000; National Starch Resin 28-2930 (terpolymer of crotonic acid (10%) 90% mixture of vinyl acetate and vinyl ester $C_{10}$-$C_{18}$ fatty acid); Elvamide.

Stabilizers: hydroquinone, p-tert-butyl catechol, 2,6-di tert-butyl-p-methylphenol, phenothiazine, N-phenyl-2-naphthylamine.

If desired, the present nail lacquer compositions may be used in conjunction with a base coat or tie coat. These latter are, as is well known in the art, applied to the nails as a preliminary coat before the nail lacquer is applied. Ordinarily, they are applied for the purpose of improving the adhesion of the nail lacquer to the nail. A typical base coat or tie coat that may be used for this purpose is shown in "Cosmetics, Science and Technology" by Edward Sagarin, Interscience Publishers, Inc. New York, 1957, page 687, "Formula 2 Basecoat."

Of special interest for use in connection with the present nail lacquer compositions are the base coat or tie coat compositions disclosed in my copending application. These are characterized by the fact that they employ a water swellable polymer system as the film former in the base coat. These serve to facilitate the removal of the top coat or nail lacquer when both have been applied to the nail. The soaking of the nails in hot water for a few minutes causes these base coats or tie coats to swell. The swelled tie or base coat causes the overlaying layer of nail lacquer to lift up and release. A variety of water swellable polymers are suitable for use in this special class of tie coats or base coats. These include such things as nitrocellulose (14% in normal nail lacquer); Amphomer 2844910; PVP/VA 535 (vinyl pyrrolidone/vinyl acetate copolymer 50/50 mole percent); PVP/VA 335 (copolymer vinyl pyrrolidone/vinyl acetate 35/65 mole percent); Gantrez AN 119 (methyl vinyl ether/maleic anhydride copolymer, 1:1 molar relationship, low molecular weight grade Av. N.W. 250,000); Gantrez AN 139 (methyl vinyl ether/maleic anhydride copolymer, 1:1 molar relationship, medium molecular weight grade, Av. M.W. 500,000); National Starch Resyn 28-2930 (terpolymer of crotonic acid (10%) and mixture of vinyl acetate and vinyl ester of $C_{10}$-$C_{18}$ fatty acids (90%) mole percent; National Starch Resyn 28-1310 (copolymer vinyl acetate (10%)/crotonic acid (90%) mole percent. Any one of the aforesaid water soluble polymers or combinations thereof may be employed formulating a tie coat which can be used in conjunction with the present invention. These will ordinarily be made up and 10% to 20% solutions of polymer in a volatile organic solvent e.g. ethanol, acetone, cosmetic solvents, etc.

The viscosity of the liquid photocurable nail lacquer compositions of this invention may vary somewhat. Generally, however, this will be in the range of from about 20 to 10,000 CPS at 25°C to 28°C using the Brookfield Model LV with Spindle 4 at 60 rpm. The preferred viscosity is about 4,300 CPS at 27°C. The viscosity of the system may be varied by means of a viscosity modifier (e.g., ethyl acetate, ethanol, isopropyl alcohol, methanol, butyl acetate, glyme, diglyme, methyl ethyl ketone, diethyl ketone, acetone, toluene, and proprietary cosmetic solvents.

In use, without employing a base or tie coat, the present nail lacquer compositions are applied to the nails of the subject. The lacquer can be applied with a brush or a porous tipped applicator. The lacquer should be applied carefully. Only when the user is satisfied with the coverage of the polish should she expose the lacquer to the light. The nails are then exposed to an actinic light source and particularly to an ultraviolet light source. These include such light sources as Type R.S. Sunlamps, carbon arc lamps, xenon arc lamps, mercury vapor lamps, tungsten halide lamps, etc. However, the most efficient process is obtained by employing a light source wherein the wave length of the light is primarily about 3,660A. When employing a light source of the latter character, the coated nails may be exposed to this light for a period of from 10 seconds to 15 minutes. This is adequate time to cure the nail lacquer composition to a suitable hardness and finish. A typical light source is a mercury arc lamp of low or medium pressure type with a suitable phosphor for low pressure arc tube to yield sufficient radiation in 3,660A radiation.

When the present nail lacquer composition is employed in conjunction with a base coat or tie coat, the latter are first applied as a thin coat which is allowed to dry. An RS type Sunlamp may facilitate the drying or the curing of the base coat or tie coat. This will ordinarily take about 20 seconds. The nail lacquer composition is then applied using the process described above.

U.S. Pat. No. 3,661,744 discloses a photocurable liquid composition containing a polyene component, a polythiol component and a photocuring rate accelerator. In describing the use to which these materials may be put the patentee first describes them very generally as serving as sealants, coatings, adhesives and molded articles. Example 84 of this patent appears to be the only place in the patent wherein some information is given as to the proposed use of these materials as coating composition. In this example, the prepolymer E of Example 5 (the polyene) of the patent is mixed with trimethylolpropane tris (β-mercapto proprionate) (the polythiol) and acetophenone (the photocuring rate accelerator). This composition is used to coat clay coated paper, cellophane, aluminum foil, steel plate stock, "Mylar" polyester film, plywood and concrete block. It is first to be noted that this proposed coating composition contains no surfactant at all, much less any one of the particular class of surfactants employed in this invention. As will be pointed out in more detail below, it was not at all obvious that this particular class of surfactants could turn the base composition of polyene, polythiol and photocuring accelerator into a composition which could serve very effectively as a nail lacquer composition. Moreover, none of the materials coated in this example can be even remotely comparable to human nails which are proteninaceous materials. This is made abundantly clear by the fact that the applicant has not been able to successfully coat human nails with compositions of the character described in this U.S. Pat. No. 3,661,744 without using surfactants from a relatively restricted class whereas the patentee was apparently capable of coating the various materials mentioned in Example 84 without using any surfactant at all.

Applicant has independently verified this fact. By using a nail lacquer composition which differed from that encompassed in this invention only for the fact that it contained no surfactant, Applicant was able to obtain even coatings on wood, concrete, metal, glass, clay and aluminum foil surfaces. This was in marked contrast to the behavior of this composition on human nails. In this .case composition beaded up when applied to nails and Applicant was unable to form a coating which was suitable as a nail cover.

In a very vague and general list of auxiliary additives appearing in Column 11, lines 35 to 54, including about 40 other additives, the patentee mentions in passing that a surfactant may be incorporated in the compositions to be cured. This appears to be the one and only place in the specification wherein a surfactant is mentioned. This is a far cry from a suggestion of the specific class of surfactants that Applicant employs. The patentee, by his general mention of surfactants, indicates that it is a matter of indifference what particular surfactant is to be employed in his system. Applicant has found that contrary to this, it is only a relatively small class of surfactants suitable for formulating a composition that could be properly applied to human nails as a nail lacquer.

As noted above, an essential component of the present comoposition is the polyene. The polyene component may be represented by the formula:

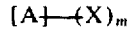

wherein $m$ is an integer of at least 2, wherein X is a member selected from the group consisting of:

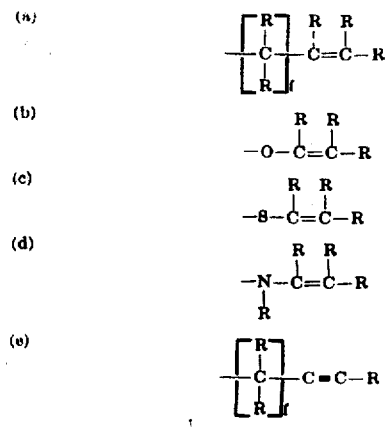

In the groups (a) to (e), $f$ is an integer from 1 to 9; R is a radical selected from the group consisting of hydrogen, fluorine, chlorine, furyl, thienyl, pyridyl, phenyl and substituted phenyl, benzyl and substituted benzyl, alkyl and substituted alkyl, alkoxy and substituted alkoxy, and cycloalkyl and substituted cycloalkyl. The substituents on the substituted members are selected from the group consisting of nitro, chloro, fluoro, acetoxy, acetamide, phenyl, benzyl, alkyl, alkoxy and cycloalkyl. Alkyl and alkoxy have from 1 to 9 carbon atoms and cycloalkyl has from 3 to 8 carbon atoms.

The members (a) to (e) are connected to [A] through divalent chemically compatible derivative members. The members (a) to (e) may be connected to [A] through a divalent chemically compatible derivative member of the group consisting of Si(R)$_2$, carbonate, carboxylate, sulfone,

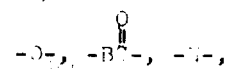

alkyl and substituted alkyl, cycloalkyl and substituted cycloalkyl, urethane and substituted urethane, urea and substituted urea, amide and substituted amide, amine and substituted amine, and aryl and substituted aryl. The alkyl members have from 1 to 9 carbon atoms, the aryl members are either phenyl or naphthyl, and the cycloalkyl have from 3 to 8 carbon atoms with R and said members substituted being defined above. B is a member of the group consisting of —O—, —S—, and —NR—.

The member [A] is polyvalent; free of reactive non-aromatic carbon to carbon unsaturation; free of highly water sensitive members; and consisting of atoms selected from the group consisting of carbon, oxygen, nitrogen, chlorine, bromine, fluorine, phosphorus, silicon and hydrogen.

The polyene component has a molecular weight in the range from about 64 to 20,000, preferably about 200 to about 10,000; and a viscosity in the range from essentially 0 to 20 million centipoises at 70°C, as measured by a Brookfield Viscometer.

More particularly, the member [A] of the polyene composition may be formed primarily of alkyl radicals, phenyl and urethane derivatives, oxygenated radicals, and nitrogen substituted radicals. The member [A] may also be represented by the formula:

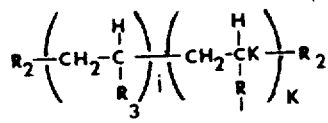

wherein $j$ and $k$ are integers greater than 1; $R_2$ is a member of the group consisting of hydrogen, and alkyl having 1 to 9 carbon atoms; $R_3$ is a member of the group consisting of hydrogen and saturated alkyl having 1 to 9 carbon atoms; $R_4$ is a divalent derivative of the group consisting of phenyl, benzyl, alkyl, cycloalkyl, substituted phenyl, substituted benzyl, substituted alkyl and substituted cycloalkyl; with the terms alkyl, cycloalkyl and members substituted being defined above.

General representative formulas for the polyenes employed in this invention are exemplified below:

1. Poly (alkylene-ether) Polyol Reacted with Unsaturated Monoisocyanates forming Polyurethane Polyenes and Related Polymers Difunctional

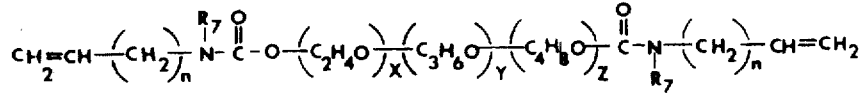

Trifunctional

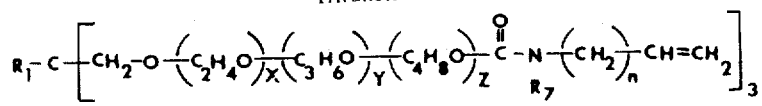

Tetrafunctional

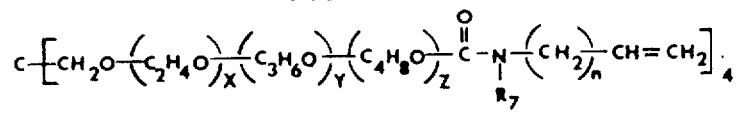

Tri-to-Hexafunctional

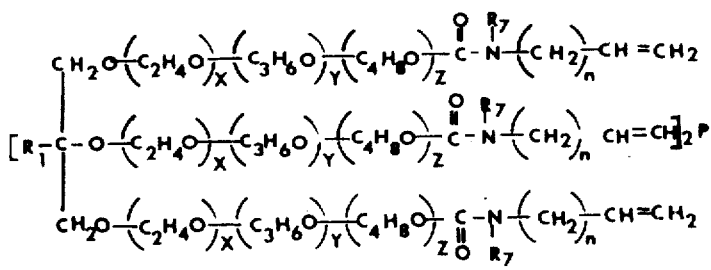

Interconnected-Modified Difunctional

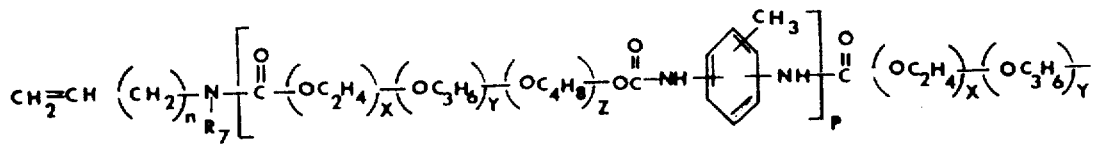

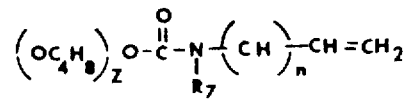

Interconnected-Modified Tetrafunctional

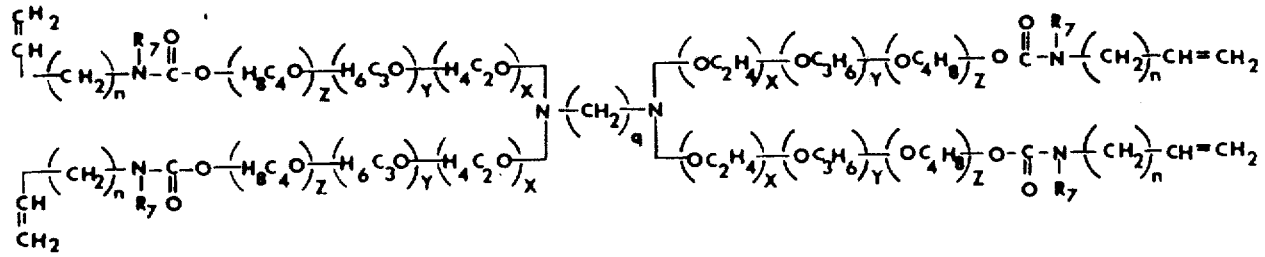

II. Poly (alkylene-ester) Polyol Reacted with Unsaturated Monoisocyanates Forming Polyurethane Polyenes and Related Polymers Difunctional

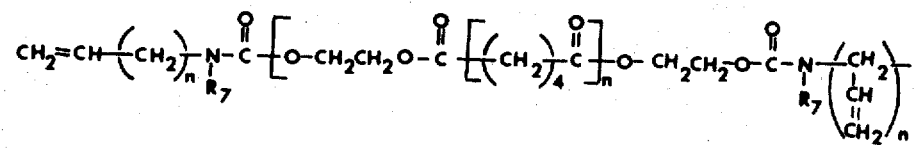

Interconnected-Modified Difunctional

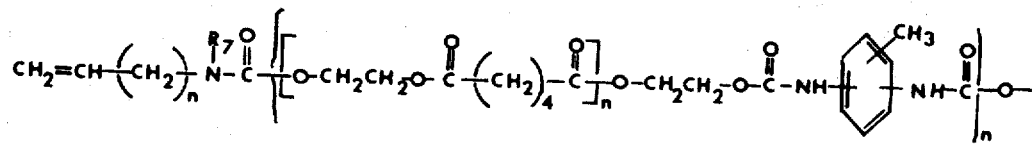

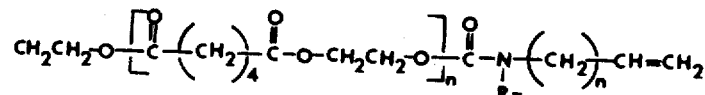

III. Poly (alkylene-ether) Polyol Reacted with Polyisocyanate and Unsaturated Monoalcohol Forming Polyurethane Polyenes and Related Polymers Difunctional

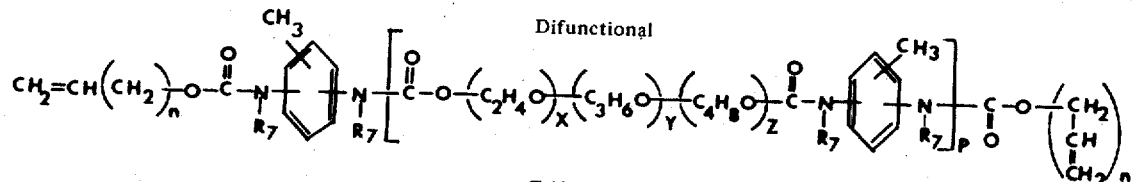

Trifunctional

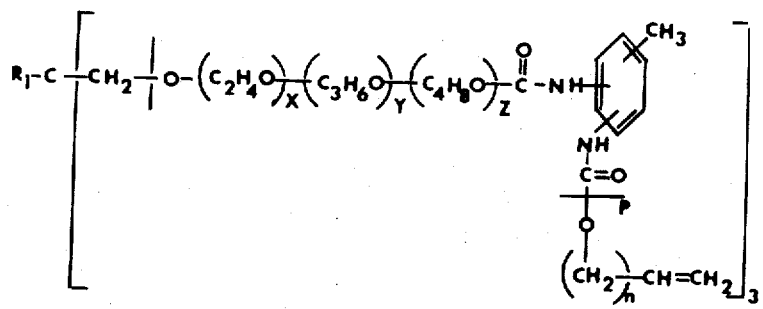

Tetrafunctional

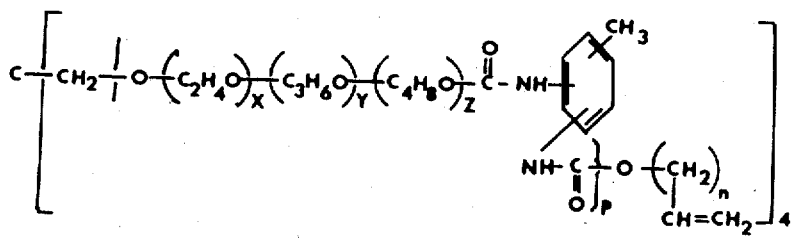

In the above formulas, the sum of $x + y + z$ in each chain segment is at least 1; p is an integer of 1 or more; q is at least 2; n is at least 1; $R_1$ is selected from the group consisting of hydrogen, phenyl, benzyl, alkyl, cycloalkyl, and substituted phenyl; and $R_7$ is a member of the group consisting of $CH_2 = CH (CH_2)_n$, hydrogen, phenyl, cycloalkyl and alkyl.

General methods for preparing the above mentioned polyenes are described in Column 7, line 9, through Column 8, line 48 of U.S. Pat No. 3,661,744; this being incorporated at this point in the present specification by way of reference.

A second essential component of the present nail lacquer composition as noted above is the polythiol. Polythiol, as used herein, refers to simple or complex organic compounds having a multiplicity of pendant or terminally positioned —SH functional groups per average molecule.

On the average, the polythiol must contain two or more —SH groups/molecule and have a viscosity range of essentially 0 to 20 million centipoises (cps) at 70°C as measured by a Brookfield Viscometer either alone or when in the presence of an inert solvent, aqueous dispersion or plasticizer. Operable polythiols in the instant invention usually have molecular weights in the range about 50 to about 20,000 and preferably from about 100 to about 10,000.

The polythiols operable in the instant invention may be exemplified by the general formula $R_8—(SH)_n$ wherein n is at least 2 and $R_8$ is a polyvalent organic moiety free from reactive non-aromatic carbon to carbon unsaturation. Thus, $R_8$ may contain cyclic groupings and hereto atoms such as N, P or O and primarily contains carbon-carbon, carbon-hydrogen, carbon-oxygen, or silicon-oxygen containing chain linkages free of any reactive non-aromatic carbon to carbon unsaturation.

One class of polythiols operable with polyenes to obtain essentially odorless polythioether products are esters of thiol containing acids of the formula $HS-R_9-COOH$ where $R_9$ is an organic moiety containing no reactive non-aromatic carbon-to-carbon unsaturation with polyhydroxy compounds of structure $R_{10}(OH)_n$ where $R_{10}$ is an organic moiety containing no reactive non-aromatic carbon to carbon unsaturation, and $n$ is 2 or greater. These components will react under suitable conditions to give a polythiol having the general structure:

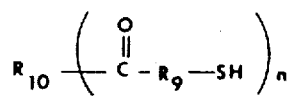

wherein $R_9$ and $R_{10}$ are organic moieties containing no reactive carbon-to-carbon unsaturation, and $n$ is 2 or greater.

Certain polythiols such as the aliphatic monomeric polythiols (ethane dithiol, hexamethylene dithiol, decamethylene dithiol, tolylene-2,4-dithiol, and the like, and some polymeric polythiols such as a thiol-terminated ethyl cyclohexyl dimercaptan polymer, and the like, and similar polythiols which are conveniently and ordinarily synthesized on a commercial basis, although having obnoxious odors, are operable but many of the end products are not widely accepted from a practical, commercial point of view. Examples of the polythiol compounds preferred because of relatively low odor level include but are not limited to esters of thioglycollic acid ($HS-CH_2COOH$), α-mercaptopropionic acid ($HS-CH(CH_3)-COOH$) and β-mercaptopropionic acid $HS-(CH_2CH_2COOH)$ with polyhydroxy compounds such as glycols, triols, tetraols, pentaols, hexaols, and the like. Specific examples of the preferred polythiols include but are not limited to ethylene glycol bis(thioglycolate), ethylene glycol bis(β-mercaptopropionate), trimethylolpropane tris (thioglycolate), trimethylolpropane tris (β-mercaptopropionate), pentaerythritol tetrakis (thioglycolate), pentaerythritol tetrakis (β-mercaptopropionate), all of which are commercially available and dipentaerythritol hexakis (β-mercaptoproprionate). A specific example of a preferred polymeric polythiol is polypropylene ether glycol bis(β-mercaptopropionate) which is prepared from polypropylene ether glycol (e.g., Pluracol P201, Wyandotte Chemical Corp.) and β-mercaptopropionic acid by esterification.

The preferred polythiol compounds are characterized by a low level of mercaptan-like odor initially, and after reaction, give essentially odorless polythioether end products which are commercially attractive and practically useful resins or elastomers.

Also of use as a polythiol component in the present invention is a class of isocyanurate containing polythiols described in U.S. Pat. No. 3,676,440. These are defined generally by the formula:

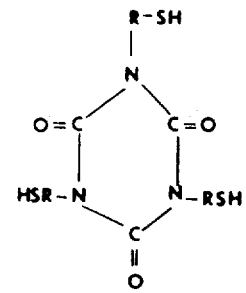

in which R is an organic divalent moiety. Ordinarily, the total number of carbon atoms in R is not greater than 13. Typical among these organic moieties, mention may be made of the following:

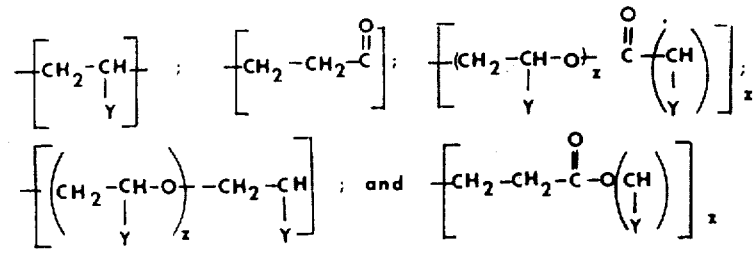

in which $y$ is hydrogen, methyl or ethyl and $z$ is an integer from 0 to 10. More particularly, these isocyanurate containing polythiols are illustrated by the following compounds: tris(3-mercaptopropionate)ester of tris(2-hydroxyethyl)isocyanurate; tris(2-mercaptoethyl)isocyanurate; tris(2-mercaptoethoxyethyl)isocyanurate; tris(2-thiocarboxyethyl)isocyanurate; tris(2-mercaptoethyl)ester of tris(2-carboxyethyl)isocyanurate; tris(11-mercaptoundecanoate)ester of tris(2-hydroxyethyl)isocyanurate; tris(3-mercaptopropionate)ester of tris(2-hydroxypropyl)isocyanurate; and tris(2-mercaptopropionate)ester of tris(2-hydroxyethyl)isocyanurate.

Certain specific polyenes and polythiols are of special interest and are preferred in the practice of the present invention. These are given below together with a short statement of how they may be prepared. For convenience of identification, these materials are given a Polythiol or a Polyene number.

Polythiols

Polythiol No. 1: pentaerythritol tetrakis (β-mercaptopropionate) This material is made by the esterification of 1 mole of pentaerythritol with 4 moles of β-mercaptopropionic acid.

Polythiol No. 2: tris(2-hydroxyethyl)isocyanurate tris(β-mercaptopropionate) This material is made by the esterification of 1 mole of tris-hydroxyethyl isocyanurate with 3 moles of β-mercaptopropionic acid.

Polythiol No. 3: trimethylolpropane tris(β-mercaptopropionate) This material is made by esterification of trimethylolpropane with 3 moles of β-mercaptopropionic acid.

Polythiol No. 4: dipentaerythritol hexakis (β-mercaptopropionate) This material is made by the esterification of dipentaerythritol with 6 moles of β-mercaptopropionic acid.

Polyenes

Polyene No. 1: This polyene is a tri-ene. It is made from allyl alcohol, malic acid and toluene diisocyanate. To prepare the polyene, one first reacts 2 moles of allyl alcohol with malic acid to give the diallyl malate ester. Separately, one then reacts one mole of allyl alcohol with one mole of toluene diisocyanate in such a way as to form the monoadduct of these two compounds with the structure:

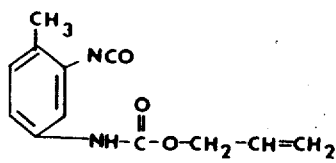

One mole of this adduct is next reacted with one mole of diallyl malate ester to give the product tri-ene which has the structure:

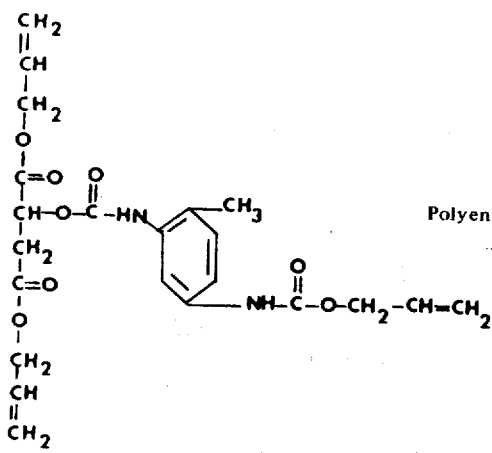

Polyene No. 1

Polyene No. 2: This polyene is a tetraene. It is made from allyl alcohol, malic acid, and toluene diisocyanate (TDI).

Either the 2,4 or the 2,6 TDI isomer may be used or mixtures thereof. To prepare the polyene, one first prepares diallyl malate by esterification. Two moles of diallyl malate ester are then reacted with one mole of TDI to give the product. A small amount of dibutyltin dilaurate is used as a catalyst. Polyene No. 2 has the following structure:

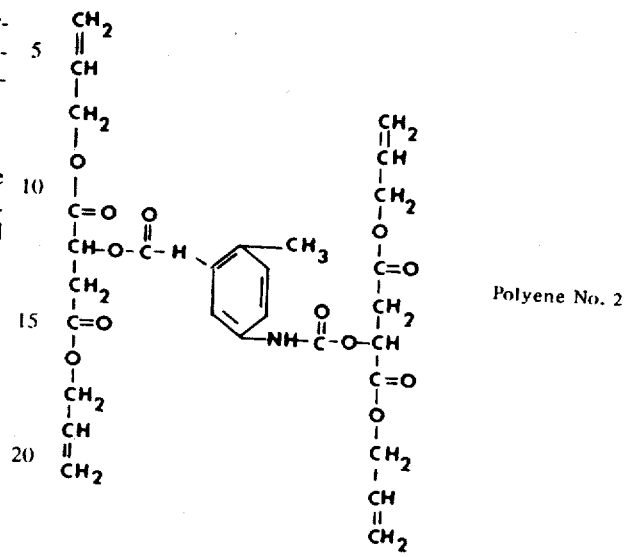

Polyene No. 2

Polyene No. 3: This polyene is a diene. It is made from bisphenol A and allyl chloride by standard etherification techniques. The structure is:

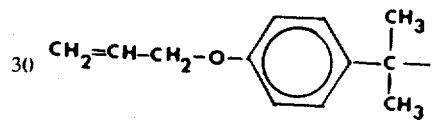

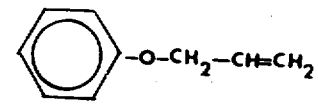

Polyene No. 4: This polyene is made from malic acid, allyl alcohol and isophorone diisocyanate. Isophorone diisocyanate has the following structure:

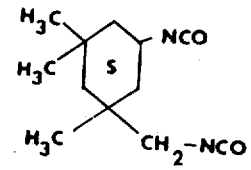

The polyene is prepared by reacting 2 moles of diallyl malate with one mole of isophorone diisocyanate in the presence of small amounts of dibutyltin dilaurate catalyst. The polyene is tetrafunctional and has the following structure:

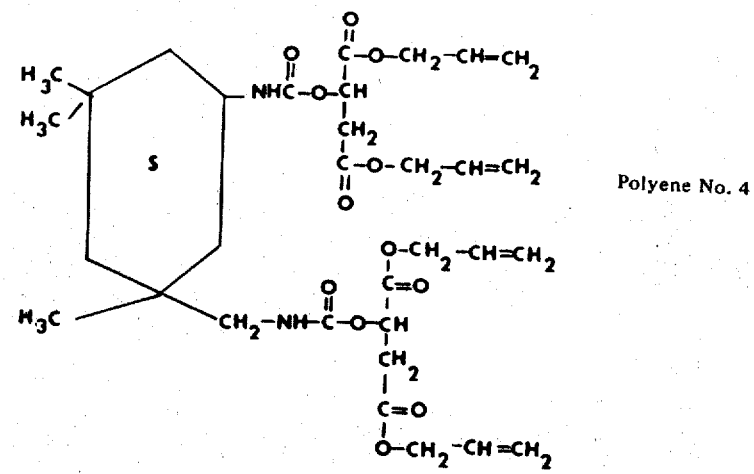

Polyene No. 4

Polyene No. 5: This polyene is a diene. It is made from TDI and allyl alcohol. Two moles of allyl alcohol are reacted with one mole of TDI in the presence of small amounts of dibutyltin dilaurate catalyst. The polyene has the following structure:

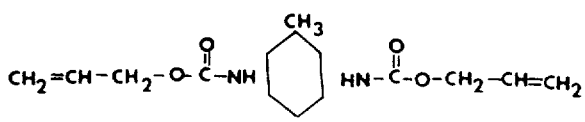

Polyene No. 6: This polyene is a tri-ene. It is triallylisocyanurate. Its structure is as follows:

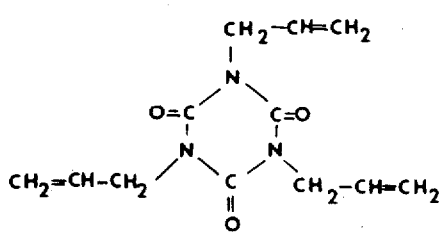

The relative quantities of polyene and polythiol that may be incorporated in the present composition may vary considerably. This seems best expressed by relating the amount of polythiol to polyene by means of a molar ratio i.e. SH groups to unsaturated groups and relating the combined amounts of polythiol to polyene to the total weight of the composition as a percent by weight based on the total weight of the composition. Accordingly, the molar ratio of the polythiol to polyene will ordinarily be in the range of from about .50:1.0 to 1.5:1.0 and preferably in the range of from about .67:1.0 to 1:1.0. Moreover, the mixture of polythiol and polyene usually comprises between about 10 to 99% by weight of the total nail lacquer compostion.

A third essential component of the present composition is the photocuring rate accelerator. It is understood to be within the scope of this invention that the photocuring rate accelerator may be present as a separate and distinct compound such as azobenzene, as a mixture of two or more separate components, such as benzophenone; benzanthrone; anthrone, and dibenzosuberone; carbon tetrachloride and phenanthrene; and the like, or in a chemically combined form within the molecular structure of either the polyene or the polythiol. An example of this latter condition wherein the photocuring rate accelerator is present not as a separate component, but rather in a form chemically combined with the polyene component is the following structure which contains four reactive carbon-to-carbon unsaturated groupings and one diaryl ketone groupings per average molecule:

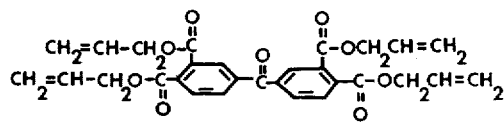

It is further understood that the polyene, the polythiol or the photocuring rate accelerator may be formed in situ in the photocurable composition without departing from the spirit of this invention.

Specifically useful herein are chemical photocuring rate accelerators such as benzophenone, acetophenone, acenapthene-quinone, o-methoxy benzophenone, thioxanthen-9-one, xanthen-9-one, 7-H-Benz[de]anthracen-7-one, dibenzosuberone, 1-naphthaldehyde, 4,4'-bis(dimethylamino) benzophenone, fluorene-9-one, 1'-acetonaphthone, 2'-acetonaphthone, anthraquinone, 1-indanone, 2-tert.-butyl anthraquinone, valerophenone, hexanophenone, 8-phenyl-butyrophenone, p-morpholinopropiophenone, 4-morpholino-benzophenone, 4'-morpholinodeoxybenzoin, p-diacetylbenzene, 4-aminobenzophenone, 4'-methoxyacetophenone, benzaldehyde, α-tetralone, 9-acetylphenanthrene, 2-acetylphenanthrene, 10-thioxanthenone, 3-acetylphenanthrene, 3-acetylindole, 1,3,5-triacetylbenzene, and the like including blends thereof, to greatly reduce the exposure times.

The curing rate accelerators are usually added in an amount ranging from about 1% to about 10% by weight of of the photocurable composition based on the total weight of the nail lacquer composition. Preferred photocuring rate accelerators are the aldehyde and ketone carbonyl compounds having at least one aromatic nucleus attached directly to the

group, e.g., benzophenone.

To obtain the maximum strength, solvent resistance, creep resistance, heat resistance and freedom from tackiness, the reaction components consisting of the polyenes and polythiols of this invention are formulated in such a manner as to give solid, crosslinked, three dimensional network polythioether polymer systems on curing. In order to achieve such infinite network formation the individual polyenes and polythiols must have a functionality of at least 2 and the sum of the functionalities of the polyene and polythiol components must always be greater than 4. Blends and mixtures of the polyenes and the polythiols containing said functionality are also operable herein.

Conventional curing inhibitors or retarders may be used in order to stabilize the components or curable compositions so as to prevent premature onset of curing. These include such things as hydroquinone; p-tert-butyl catechol; 2,6-di tert.-butyl-p-methylphenol; phenothiazine; N-phenyl-2-naphthylamine; inert gas atmospheres such as helium, argon, nitrogen and carbon dioxide.

A fourth essential component of the nail lacquer composition of the present invention is one or more of a certain class of certain specific surfactants. Among the preferred surfactants in this group are sorbitan sesquioleate, sorbitan dioleate, sorbitan trioleate, pentaerythritol dioleate, and pentaerythritol trioleate.

The following surfactants are less effective but are nevertheless operative for the present purposes: alkenyldimethylethyl ammonium bromide; di "coco" dimethyl ammonium chloride; quaternary imidazolinium salt (from stearic acid); glyceryl monooleate; glyceryl dioleate; glyceryl trioleate and polyglycerol ester of oleic acid. These surfactants are soluble in the present system, but this does not appear to be a sufficient reason to explain their operability since many surfactants were tested which were soluble in the system but still were not operative for the intended purpose.

The operability of the surfactant for its intended purpose in the instant composition was tested by incorporating a standard amount of surfactant (generally about 1% by weight based on the total weight of the nail lacquer composition) in the composition containing a standard amount of the polyene, polythiol and photocuring accelerator and observing the tendency of the composition to "bead" when applied to the surface of the nail. Using this technique upwards of 70 surfactants were tested to determine their operability several of which were structurally closely related to those mentioned above and found to be operative. For some reason which Applicant is unable to explain, these were found to be inoperative. Thus, glyceryl monolaurate and glyceryl distearate showed no benefit and glyceryl monoleate gave results which were equivocal. Similarly, whereas sorbitan sesquioleate, sorbitan dioleate and sorbitan trioleate were found to be operative, sorbitan monoleate was not useful. Moreover, whereas pentaerythritol dioleate and trioleate were useful, the pentaerythritol distearate is a solid which is not soluble in the system employed and could not be employed as such.

Below is a list of surfactants which have been tested in accordance with the above criteria and found to be inoperative either because they do not improve the wetability of nail lacquer compositions on human nails or are insoluble in this composition:

Cationics
Dodecyltrimethyl ammonium chloride
Hexadecyltrimethyl ammonium chloride
Octadecyltrimethyl ammonium chloride
"Tallow" trimethyl ammonium chloride
Cetyltrimethyl ammonium bromide
Cetyldimethylethyl ammonium bromide
"Coco" trimethyl ammonium chloride
"Soya" trimethyl ammonium chloride
Dilauryldimethyl ammonium bromide
Methyldodecylbenxyl trimethyl ammonium chloride
Alkyldimethyl-3-4-dichlorobenzyl ammonium chloride
Quaternary Imidazolium salts (for coco acids)
Laurylisoquindium bromide
Nonionics
Glyceryl monolaurate
Glyceryl dilaurate
Glyceryl distearate
Glyceryl monoricinoleate
Modified glyceryl phthalate resin
Polyoxyethylated castor oil (20 moles ethylene oxide)
Polyoxyethylated castor oil (40 moles ethylene oxide)
Polyoxyethylated sorbitol monolaurate
Polyoxyethylated sorbitan monolaurate
Polyoxyethylated sorbitan monopalmitate
Polyoxyethylated sorbitan monostearate
Polyoxyethylated tert. octylphenol
Polyoxypropylene + 80% ethylene oxide Nonionics
Esters of Polyoxyethylated Sorbitol, Sorbitan or Sorbide:
Polyoxyethylated sorbitan monostearate (20 moles ethylene oxide)
Polyoxyethylated sorbitan tristearate (20 moles ethylene oxide)
Polyoxyethylated sorbitan monooleate
Polyoxyethylated sorbitan monooleate (20 moles ethylene oxide)
Polyoxyethylated sorbitan trioleate (20 moles ethylene oxide)
Esters of other Polyhydric Alcohols:
Sorbitan monolaurate
Sorbitan monooleate
Sucrose monomyristate
Sucrose monostearate
Sucrose monooleate
Sucrose dioleate
Sucrose monotallowate
Pentaerythritol distearate
Pentaerythritol tetrastearate
Ethers of Polyoxyalkene Glycols:
tert.octylphenoxy ethanol
Polyoxyethylated tert.octylphenol (3 moles ethylene oxide)
Polyoxyethylated tert.octylphenol (5 moles ethylene oxide)
Polyoxyethylated tert.octylphenol (7–8 moles ethylene oxide)
Polyoxyethylated tert.octylphenol (12–13 moles ethylene oxide)
Polyoxyethylated tert.octylphenol (16 moles ethylene oxide)
Polyoxyethylated tert.octylphenol (30 moles ethylene oxide)
Polyoxyethylated tert.actylphenol octylphenol (40 moles ethylene oxide)
Polyoxyethylated nonylphenol (1–2 moles ethylene oxide)
Polyoxyethylated nonylphenol (4 moles ethylene oxide)
Polyoxyethylated nonylphenol (6 moles ethylene oxide)
Polyoxyethylated nonylphenol (8 moles ethylene oxide)
Polyoxyethylated nonylphenol (9–10 moles ethylene oxide)
Polyoxyethylated nonylphenol (10–11 moles ethylene oxide)
Polyoxyethylated nonylphenol (12 moles ethylene oxide)
Polyoxyethylated nonylphenol (15 moles ethylene oxide)
Oleates:
Dioleate of polyethylene glycol (200)
Dioleate of polyethylene glycol (400)
Dioleate of polyethylene glycol (600)

The quantity of surfactant component which may be incorporated into the present composition may vary somewhat. Ordinarily, it will constitute between about 0.5% to 1.0% based on the total weight of the composition.

The following Examples are given to further illustrate the present invention. It is to be understood, however, that the invention is not limited thereto.

In the following Examples all the percentages are given as percent by weight unless otherwise indicated. The polyene and polythiol are identified by the Polyene and Polythiol numbers described above.

EXAMPLE 1

All the ingredients listed in the formula below were placed in a mixing vessel and thoroughly stirred. The mix was then milled to insure the production of a homogenous product in which the solids are uniformly distributed:

Nail Lacquer

| Ingredient | Percent |
|---|---|
| Polyene No. 2 | 47.75 |
| Polythiol No. 1 | 43.20 |
| Benzophenone | 5.42 |
| Hydroquinone | .12 |
| Sorbitan Trioleate | 1.00 |
| Rubine Lake (CI 15850) | .95 |
| Black (CI 77499) | .06 |
| D&C Red No. 30 (CI 73360) | .52 |
| D&C Yellow No. 5 (CI 19140) | .13 |
| Titanium Dioxide | .85 |

In applying this composition to human nails, the nails are first cleaned with a solvent to remove all dirt and debris. If desired, an undercoat may now be applied to the nails. A suitable undercoat is a 20% solution of Gantrez AN 119 resin (methyl vinyl ether/maleic anhydride 1:1 M.W. 250,000) in acetone. A coat of the above described nail lacquer was then brushed onto the nails. The coated nails were then exposed to the light from a 4FT5BL lamp for a minute to one minute and fifteen seconds. This light source is in the range of from 3,500 to 3,880A and is predominantly light having a wave length of about 3,660A. At the end of this exposure, the nail lacquer was cured to a tough nail coating.

The following Examples are given in tabular form. The formulas were compounded and applied to nails using the same procedure described in Example 1. Similar results were obtained.

Table I

| Ingredients | Ex.2 | Ex.3 | Ex.4 | Ex.5 | Ex.6 |
|---|---|---|---|---|---|
| Polyene No. 2 | 48.178 | 48.298 | 48.30 | 48.44 | 48.25 |
| Polythiol No. 1 | 43.598 | 43.715 | 43.61 | 43.79 | 43.68 |
| Benzophenone | 5.468 | 5.481 | 5.62 | 5.49 | 5.47 |
| Hydroquinone | .127 | .128 | .13 | .13 | .13 |
| Sorbitan trioleate | 1.000 | 1.000 | 1.00 | 1.00 | 1.00 |
| Sorbitan dioleate | | | | | |
| Sorbitan sesquioleate | | | | | |
| Pentaerythritol dioleate | | | | | |
| Pentaerythritol trioleate | | | | | |
| Rubine Lake (CI 15850) | | .953 | | | |
| Black (CI 77499) | | .004 | | | |
| D&C Red No. 30 (CI 73360) | .043 | | | | |
| D&C Yellow No. 5 (CI 19140) | | | | | |
| Titanium dioxide | 1.586 | | | | |
| D&C Red No. 6 (CI 15850) | | .009 | | | |
| D&C Red No. 7 (CI 15850:1) | | .412 | | | |
| Cosmetic umber (CI 77491) | | | 1.07 | | |
| D&C Red No. 13 (CI 15630:3) | | | .27 | | 1.47 |
| Pure oxy red (CI 77491) | | | | 1.15 | |

| Ingredients | Ex. 7 | Ex. 8 | Ex. 9 | Ex. 10 |
|---|---|---|---|---|
| Polyene No. 2 | 47.75 | → | → | → |
| Polythiol No. 1 | 43.20 | → | → | → |
| Benzophenone | 5.42 | → | → | → |
| Hydroquinone | .12 | → | → | → |
| Sorbitan trioleate | | | | |
| Sorbitan dioleate | 1.00 | | | |
| Sorbitan sesquioleate | | 1.00 | | |
| Pentaerythritol dioleate | | | 1.00 | |
| Pentaerythritol trioleate | | | | 1.00 |
| Rubine Lake (CI 15850) | .95 | → | → | → |
| Black (CI 77499) | .06 | → | → | → |
| D&C Red No. 30 (CI 73360) | .52 | → | → | → |
| D&C Yellow No. 5 (CI 19140) | .13 | → | → | → |
| Titanium dioxide | .85 | → | → | → |
| D&C Red No. 6 (CI 15850) | | | | |
| D&C Red No. 7 (CI 15850:1) | | | | |
| Cosmetic Umber (CI 77491) | | | | |
| D&C Red No. 13 (CI 15630:3) | | | | |
| Pure oxy red (CI 77491) | | | | |

The following Examples are also given in tabular form. The compositions are prepared using the procedure given in Example 1. These compositions are applied to human nails using the procedure and apparatus also described in Example 1. The percentages of polyene and polythiol contained in the composition are given as the combined weight of polyene and polythiol, the relative amounts of polyene and polythiol contained in the combination being expressed as the molar ratio of polythiol to polyene, i.e., the molar ratio of unsaturated groups to SH groups.

TABLE II

| | Ex.11 | Ex.12 | Ex.13 | | |
|---|---|---|---|---|---|
| Polyene No. | No 1 | | No 1 | No 1 | |
| Polythiol No. | No 1 | | No 3 | No 4 | |
| Molar ratio Polythiol:Polyene | 1:1 | 1:1 | 1:1 | | |
| % Polyene + Polythiol | 90.95 | 91.90 | 90.95 | | |
| % Benzophenone | — | — | — | | |
| % Acetophenone | 5.42 | — | — | | |
| % o-Methoxy benzophenone | — | 5.62 | — | | |
| % Dibenzosuberone | — | — | 5.42 | | |
| % Hydroquinone | .12 | .13 | .12 | | |
| % Sorbitan trioleate | 1.00 | — | — | | |

TABLE II—Continued

|  | Ex.11 | Ex.12 | Ex.13 |
|---|---|---|---|
| % Sorbitan dioleate | — | 1.00 | — |
| % Sorbitan sesquioleate | — | — | 1.00 |
| % Pentaerythritol dioleate | — | — | — |
| % Pentaerythritol trioleate | — | — | — |
| % Rubine Lake (CI 15850) | .95 | — | .95 |
| % Black (CI 77499) | .06 | — | .06 |
| % D&C Red No. 30 (CI 73360) | .52 | — | .52 |
| % D&C Yellow No. 5 (CI 19140) | .13 | — | .13 |
| % Titanium dioxide | .85 | — | .85 |
| % Cosmetic umber (CI 77491) | — | 1.07 | — |
| % D&C Red No. 13 (CI 15630:3) | — | .28 | — |

|  | Ex.14 | Ex.15 | Ex.16 | Ex.17 | Ex.18 | Ex.19 |
|---|---|---|---|---|---|---|
| Polyene No. | No | No | No | 2 | No | 2, 3 |
| Polythiol No. | No | No | No | 3 | No | 4, 3 |
| Molar ratio Polythiol:Polyene | 1:1 | .80:1 | .84:1 | 1:1 | 1:1 | 1:1 |
| % Polyene + Polythiol | 90.95 | → | | | | |
| % Benzophenone | 5.42 | → | | | | |
| % Acetophenone | — | — | | | | |
| % o-Methoxy benzophenone | — | — | — | | | |
| % Dibenzosuberone | — | — | — | | | |
| % Hydroquinone | .12 | → | | | | |
| % Sorbitan trioleate | — | — | 1.00 → | | | |
| % Sorbitan dioleate | — | — | — | | | |
| % Sorbitan sesquioleate | — | — | — | | | |
| % Pentaerythritol dioleate | 1.00 | — | — | | | |
| % Pentaerythritol trioleate | — | 1.00 | — | | | |
| % Rubine Lake (CI 15850) | .95 → | | | | | |
| % Black (CI 77499) | .06 → | | | | | |
| % D&C Red No. 30 (CI 73360) | .52 → | | | | | |
| % D&C Yellow No. 5 (CI 19140) | .13 → | | | | | |
| % Titanium dioxide | .85 → | | | | | |
| % Cosmetic umber (CI 77491) | — | — | — | | | |
| % D&C Red No. 13 (CI 15630:3) | — | — | — | | | |

|  | Ex.20 | Ex.21 | Ex.22 | Ex.23 | Ex.24 |
|---|---|---|---|---|---|
| Polyene No. | No | 3 | No | 4 | No, 4 |
| Polythiol No. | No | 4 | No | 1 | No, 2 |
| Molar ratio Polythiol:Polyene | 1:1 | 1:1 | .67:1.0 | 1:1 | 1:1 |
| % Polyene + Polythiol | 90.95 → | | | | |
| % Benzophenone | 5.42 → | | | | |
| % Acetophenone | — | | | | |
| % o-Methoxy benzophenone | — | | | | |
| % Dibenzosuberone | — | | | | |
| % Hydroquinone | .12 → | | | | |
| % Sorbitan trioleate | 1.00 → | | | | |
| % Sorbitan dioleate | — | | | | |
| % Sorbitan sesquioleate | — | | | | |
| % Pentaerythritol dioleate | — | | | | |
| % Pentaerythritol trioleate | — | | | | |
| % Rubine Lake (CI 15850) | .95 → | | | | |
| % Black (CI 77499) | .06 → | | | | |
| % D&C Red No. 30 (CI 73360) | .52 → | | | | |
| % D&C Yellow No. 5 (CI 19140) | .13 → | | | | |
| % Titanium dioxide | .85 → | | | | |
| % Cosmetic umber (CI 77491) | — | | | | |
| % D&C Red No. 13 (CI 15630:3) | — | | | | |

|  | Ex.25 | Ex.26 | Ex.27 | Ex.28 | Ex.29 |
|---|---|---|---|---|---|
| Polythiol No. | No | 5 | No | 5 | No, 5 |
| Polyene No. | No | 1 | No | 2 | No, 3 |
| Molar ratio Polythiol:Polyene | 1:1 | 1:1 | .80:1.0 | 1:1 | 1:1 |
| % Polyene + Polythiol | 90.95 → | | | | |
| % Benzophenone | 5.42 → | | | | |
| % Acetophenone | — | | | | |
| % o-Methoxy benzophenone | — | | | | |
| % Dibenzosuberone | — | | | | |
| % Hydroquinone | .12 → | | | | |
| % Sorbitan trioleate | 1.00 → | | | | |
| % Sorbitan dioleate | — | | | | |
| % Sorbitan sesquioleate | — | | | | |
| % Pentaerythritol dioleate | — | | | | |
| % Pentaerythritol trioleate | — | | | | |
| % Rubine Lake (CI 15850) | .95 → | | | | |
| % Black (CI 77499) | .06 → | | | | |
| % D&C Red No. 30 (CI 73360) | .52 → | | | | |
| % D&C Yellow No. 5 (CI 19140) | .13 → | | | | |
| % Titanium dioxide | .85 → | | | | |
| % Cosmetic umber (CI 77491) | — | | | | |
| % D&C Red No. 13 (CI 15630:3) | — | | | | |

|  | Ex.30 | Ex.31 | Ex.32 |
|---|---|---|---|
| Polyene No. | No.6 | No.6 | No.6 |
| Polythiol No. | No.2 | No.3 | No.4 |
| Molar ratio Polythiol:Polyene | 1:1 | 1:1 | .75:1.0 |
| % Polyene + Polythiol | 90.95 → | | |
| % Benzophenone | 5.42 → | | |
| % Acetophenone | — | | |
| % o-Methoxy benzophenone | — | | |
| % Dibenzosuberone | — | | |
| % Hydroquinone | .12 → | | |

TABLE II—Continued

|  | Ex. 30 | Ex. 31 | Ex. 32 |
|---|---|---|---|
| % Sorbitan trioleate | 1.00 → | | |
| % Sorbitan dioleate | — | | |
| % Sorbitan sesquioleate | — | | |
| % Pentaerythritol dioleate | — | | |
| % Pentaerythritol trioleate | — | | |
| % Rubine Lake (CI 15850) | .95 → | | |
| % Black (CI 77499) | .06 → | | |
| % D&C Red No. 30 (CI 73360) | .52 → | | |
| % D&C Yellow No. 5 (CI 19140) | .13 → | | |
| % Titanium dioxide | .85 → | | |
| % Cosmetic umber (CI 77491) | — | | |
| % D&C Red No. 13 (CI 15630:3) | — | | |

What is claimed is:

1. A photocurable liquid nail lacquer composition comprising in photocurably effective amounts as separate components distinct from each other from 1% to about 98.5% by weight of a mixture of a polyene component and 0.5% to 1.0% by weight of a polythiol component, 1% to 10% by weight of a photocuring rate accelerator component and a surfactant which is soluble in said liquid composition and selected from the group consisting of sorbitan sesquioleate, sorbitan dioleate, sorbitan trioleate, pentaerythritol dioleate, pentaerythritol trioleate, glyceryl monooleate, glyceryl dioleate, glyceryl trioleate, polyglycerol ester of oleic acid, alkenyldimethylethyl ammonium bromide, di "coco" dimethyl ammonium chloride, and quaternary imidazolinium salt (from stearic acid) wherein:

A. Said polyene component being a terminally unsaturated polyene which comprises the formula:

$$[A{+}X]_m$$

herein $m$ is an integer of at least 2, wherein X is

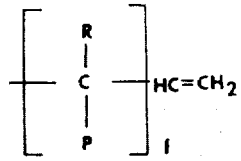

where $f$ is an integer from 1 to 9; R is a radical selected from the group consisting of hydrogen, fluorine, chlorine, furyl, thienyl, pyridyl, phenyl and substituted phenyl, benzyl and substituted benzyl, alkyl and substituted alkyl, alkoxy and substituted alkoxy, cycloalkyl and substituted cycloalkyl; said substituents on said substituted members being selected from the group consisting of nitro, chloro, fluoro, acetoxy, acetamide, phenyl, benzyl, alkyl, alkoxy and cycloalkyl; said alkyl and alkoxy having from one to nine carbon atoms and said cycloalkyl having from three to eight carbon atoms; wherein [A] is free of reactive non-aromatic carbon-to-carbon unsaturation; free of highly water sensitive members, and is a polyvalent chemically compatible member of the group consisting of carbonate, carboxylate, carbonyl, ether, silane, silicate, phosphonate, phosphite, phosphate, alkyl and substituted alkyl, cycloalkyl and substituted cycloalkyl, aryl and substituted aryl, urethane and substituted urethane, urea and substituted urea, amine and substituted amine, amide and substituted amide, hydroxyl, heterocyclic carbon containing radical, and mixtures thereof, said substituents on said members being defined above, said component 64 to 20,000; and a viscosity in the range from essentially 0 to 20 million centipoises at 70°C; and B. said polythiol component having a molecular weight in the range from about 50 to about 20,000 of the general formula:

$$R_8{+}SH)_n$$

wherein $R_8$ is a polyvalent organic moiety free from reactive non-aromatic carbon-to-carbon unsaturation and $n$ is at least 2, the sum of $m$ and $n$ being greater than 4, with the ene/thiol mole ratio being in the range of about 0.50:1.0 to 1.5:1.0 so as to provide a cross-linked solid, self-supporting cured product.

2. A composition according to claim 1 in which the surfactant is sorbitan sesquioleate.

3. A composition according to claim 1 in which the surfactant is sorbitan dioleate.

4. A composition according to claim 1 in which the surfactant is sorbitan trioleate.

5. A composition according to claim 1 in which the surfactant is pentaerythritol dioleate.

6. A composition according to claim 1 in which the surfactant is pentaerythritol trioleate.

7. A composition according to claim 1 wherein the photocuring rate accelerator is selected from the group consisting of aryl aldehyde, diaryl ketone, alkyl aryl ketone, triaryl phosphine and a blend of carbon tetrahalide with polynuclear aromatic hydrocarbon.

8. A composition according to claim 7 containing from about 0.5% to 1.0% by weight of said surfactant, about 1% to 10% by weight of said photocuring rate accelerator and from about 1% to about 98.5% by weight of a mixture of said polythiol and said polyene, the molar ratio of polythiol to polyene in said mixture being in the range of about .50:1.0 to 1.5:1.0.

9. The composition according to claim 8 wherein said polyene is

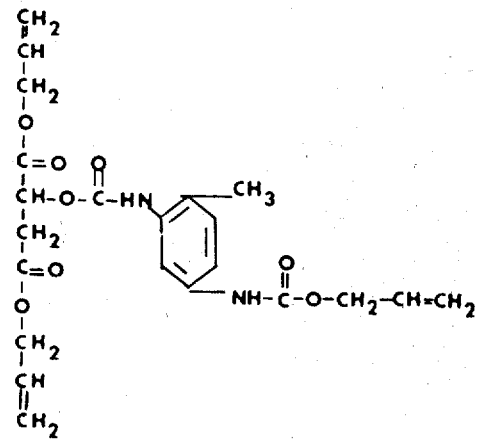

10. A composition according to claim 9 wherein said polythiol is pentaerythritol tetrakis (β-mercaptopropionate).

11. A composition according to claim 9 wherein said polythiol is tris(2-hydroxyethyl)isocyanurate tris (β-mercaptopropionate).

12. A composition according to claim 9 wherein said polythiol is trimethylolpropane tris(β-mercaptopropionate).

13. A composition according to claim 9 wherein said polythol is dipentaerythritol hexakis (β-mercaptopropionate).

14. A composition according to claim 8 wherein said polyene is

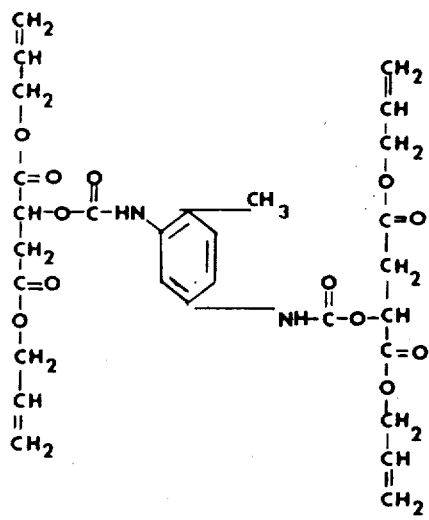

15. A composition according to claim 14 wherein said polythiol is pentaerythritol tetrakis (β-mercaptopropionate).

16. A composition according to claim 14 wherein said polythiol is tris (2-hydroxyethyl)isocyanurate tris (β-mercaptopropionate).

17. A composition according to claim 14 wherein said polythiol is trimethylolpropane tris (β-mercaptopropionate).

18. A composition according to claim 14 wherein said polythiol is dipentaerythritol hexakis (β-mercaptopropionate).

19. A composition according to claim 8 wherein said polyene is

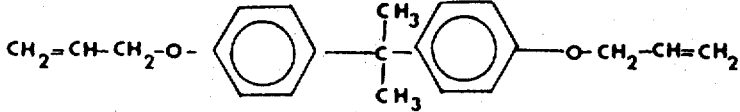

20. A composition according to claim 19 wherein said polythiol is pentaerythritol tetrakis (β-mercaptopropionate).

21. A composition according to claim 19 wherein said polythiol is tris (2-hydroxyethyl)isocyanurate tris (β-mercaptopropionate).

22. A composition according to claim 19 wherein said polythiol is trimethylolpropane tris (β-mercaptopropionate).

23. A composition according to claim 19 wherein said polythiol is dipentaerythritol hexakis (β-mercaptopropionate).

24. A composition according to claim 8 wherein said polyene is

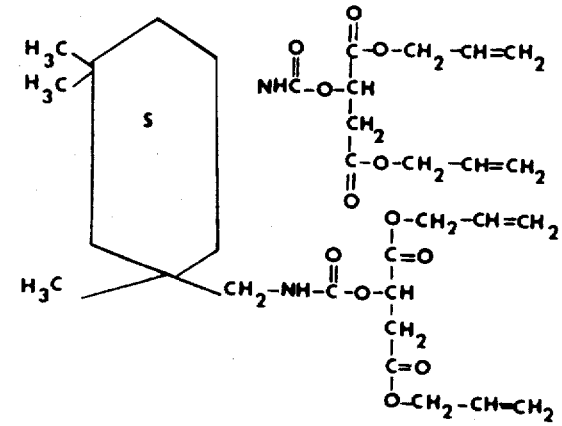

25. A composition according to claim 24 wherein the polythiol is pentaerythritol tetrakis (β-mercaptopropionate).

26. A composition according to claim 24 wherein the polythiol is tris (2-hydroxyethyl)isocyanurate tris (β-mercaptopropionate).

27. A composition according to claim 24 wherein the polythriol is trimethylolpropane tris (β-mercaptopropionate).

28. A composition according to claim 24 wherein the polythiol is dipentaerythritol hexakis (β-mercaptopropionate).

29. A composition according to claim 8 wherein said polyene is

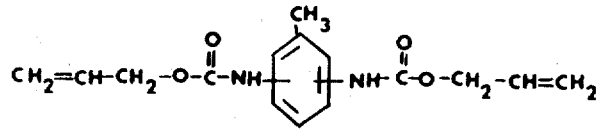

30. A composition according to claim 29 wherein said polythiol is pentaerythritol tetrakis (β-mercaptopropionate).

31. A composition according to claim 29 wherein said polythiol is tris (2-hydroxyethyl)isocyanurate tris (β-mercaptopropionate).

32. A composition according to claim 29 wherein said polythiol is trimethylolpropane tris (β-mercaptopropionate).

33. A composition according to claim 29 wherein said polythiol is dipentaerythritol hexakis (β-mercaptopropionate).

34. A composition according to claim 8 wherein said polyene is

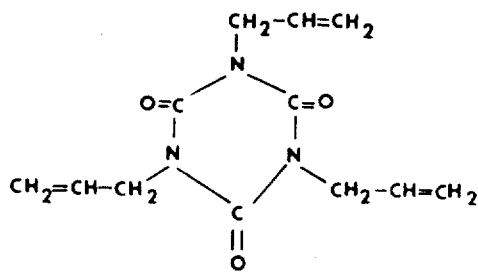

35. A composition according to claim 34 wherein said polythiol is pentaerythritol tetrakis (β-mercaptopropionate).

36. A composition according to claim 34 wherein said polythiol is tris (2-hydroxyethyl)isocyanurate tris (β-mercaptopropionate).

37. A composition according to claim 34 wherein said polythiol is trimethylolpropane tris (β-mercaptopropionate).

38. A composition according to claim 34 wherein said polythiol is dipentaerythritol hexakis (β-mercaptopropionate).

39. A composition according to claim 8 wherein the surfactant is selected from the group consisting of sorbitan sesquioleate, sorbitan dioleate, sorbitan trioleate, pentaerythritol dioleate and pentaerythritol trioleate.

* * * * *